(12) United States Patent
Perl et al.

(10) Patent No.: US 7,170,441 B2
(45) Date of Patent: Jan. 30, 2007

(54) TARGET LOCALIZATION USING TDOA DISTRIBUTED ANTENNA

(75) Inventors: Elyahu Perl, Dewitt, NY (US); Michael J Gerry, Manlius, NY (US)

(73) Assignee: Sensis Corporation, Dewitt, NY (US)

( * ) Notice: Subject to any disclaimer, the term of this patent is extended or adjusted under 35 U.S.C. 154(b) by 191 days.

(21) Appl. No.: 10/914,530

(22) Filed: Aug. 9, 2004

(65) Prior Publication Data
US 2005/0035897 A1 Feb. 17, 2005

Related U.S. Application Data

(60) Provisional application No. 60/505,997, filed on Sep. 25, 2003, provisional application No. 60/494,963, filed on Aug. 14, 2003.

(51) Int. Cl.
*G01S 13/93* (2006.01)
(52) U.S. Cl. .................... 342/29; 342/30; 342/32; 342/36; 342/37; 342/126; 342/463
(58) Field of Classification Search ........... 342/29–38, 342/42–50, 59, 95, 107, 108, 115, 126, 146, 342/450, 451, 454–456, 462–465
See application file for complete search history.

(56) References Cited
U.S. PATENT DOCUMENTS 6,208,297 B1    3/2001  Fattouche et al. .......... 342/450
6,243,648 B1 *  6/2001  Kilfeather et al. .......... 701/213
2003/0017832 A1 * 1/2003  Anderson et al. .......... 455/456
2004/0017312 A1 * 1/2004  Anderson et al. .......... 342/457
2005/0035897 A1 * 2/2005  Perl et al. .................. 342/29

FOREIGN PATENT DOCUMENTS

EP           1094335        4/2001

OTHER PUBLICATIONS

"Recursive least squares solution to source tracking using time difference of arrival", Hashemi-Sakhtsari, A.; Dogancay, K. (ICASSP '04), May 17-21, 2004 Ps: ii-385-8 vol. 2.*

"A location system using asynchronous distributed sensors", Li, T.; Ekpenyong, A.; Huang, Y.-F. INFOCOM 2004. Twenty-third AnnualJoint Conference of the IEEE Computer and Communications Societies vol. 1, Mar. 7-11, 2004 Ps: 620-628.*

(Continued)

*Primary Examiner*—John B. Sotomayor
(74) *Attorney, Agent, or Firm*—Burr & Brown

(57) ABSTRACT

This invention is a system and method of locating a target using distributed antenna. The antenna consists of several receiving elements in known locations. At least one of the receiving elements is also a transmitter and transmits an interrogation signal to a target. The return signal from the target is received by a plurality of receiving elements and the target's position is calculated using the time of arrivals of the reply signal and the round trip delay between the transmission of the interrogation signal and the reception of the subsequent reply signal.

49 Claims, 9 Drawing Sheets

OTHER PUBLICATIONS

"Maximum likelihood estimator approach to determine the target angular co-ordinates in presence of main beam interference: application to live data acquired with a microwave phased array radar", Farina, A.; Golino, G.; Timmoneri, L. Radar Conference, 2005 IEEE Int'l May 9-12, 2005 Ps: 61-66.*

"A robust location algorithm with biased extended Kalman filtering of TDOA data for wireless sensor networks", Chen Hongyang et al, Wireless Communications, Networking and Mobile Computing, 2005. Proceedings. Int'l Conf on vol. 2. Sep. 23-26, 2005 Ps: 883-886.*

"A Passive Radar Surveillance System Vera For ATC," IRS 98 International Radar Symposium. *Proceedings of the Symposium*, Munich, Sep. 15-17, 1998, Bonn : Dgon, DE, vol. vol. 1, Sep. 15, 1998, pp. 39-48.

* cited by examiner

PRIOR ART

TARGET LOCALIZATION USING TDOA DISTRIBUTED ANTENNA

CROSS REFERENCE TO RELATED APPLICATIONS

This application claims the benefit under 35 USC § 119(e) of U.S. Provisional Application Ser. No. 60/494,963, filed Aug. 14, 2003 and U.S. Provisional Application Ser. No. 60/505,997, filed Sep. 25, 2003, the entireties of which are incorporated herein by reference.

FIELD OF THE INVENTION

The invention relates to ground-based or airborne air traffic surveillance systems, particularly to direction finding and target localization using a TDOA (Time Differential of Arrival) distributed antenna.

BACKGROUND OF THE INVENTION

In the current art a number of systems and methodologies exist for the localization of ground vehicles and aircraft (e.g., targets) in and around air traffic surveillance systems which can include airports, terminal areas and en route systems.

Many large airports utilize approach radar systems to locate and track targets outside the airport. These radar systems obtain good azimuth accuracy by using the narrow beam available from the large aperture antenna, whereas the range is calculated from the round trip delay of the signal from the radar to the target and back. Typically these approach radar systems require large rotating antennas making them expensive. In addition, these radar systems characteristically have an update rate of approximately 4.5 seconds, and consequently the response speed of the associated analysis equipment is limited by the update rate of the radar.

A second method for target localization is multilateration. Multilateration systems typically are made up of an arrangement of beacon transmitters and receivers. Multilateration is a Time Differential of Arrival (TDOA) technique that uses information from aircraft transponder transmissions to determine the precise location of a target. The algorithm for multilateration typically starts by estimating, using TDOA information, the approximate location of a target in either a two-dimensional or three-dimensional coordinate system. An optimization process is then performed around the approximate location of the target to provide a more accurate location of the target.

Multilateration systems can be used to locate and track targets on the ground at the airport for runway incursion and can also be used for locating and tracking approaching aircraft within relative close proximity to an airport and by en route air traffic surveillance systems. However, if it is required to provide large area coverage around the multilateration system, the ratio of the antenna baseline (distance between the receivers) to the range of the target becomes such that the Geometric Dilution of Precision (GDOP) becomes quite large. It therefore becomes more difficult to locate the target within the "ellipse of uncertainty" and the effectiveness of the multilateration system is significantly degraded as the distance from the system to the target increases.

One method to overcome this problem with the current multilateration technique is to install external antenna elements outside the boundaries of the multilateration system to increase the size of the antenna baseline. This, however, creates difficulties with regard to purchasing additional real estate, providing security outside of the system, maintenance of the external antenna elements, communication between the external antenna elements and the system, and other logistical issues.

While many air traffic surveillance systems are using one, or a combination of the above-detailed methodologies, some airports currently have no local, reliable methodologies for locating approaching aircraft, or vehicles on the ground for runway incursion. Some of these airports have adopted the practice of acquiring radar data from larger, better-equipped airports in their vicinity to provide information on the air traffic in their area. While this process can be beneficial to airports that would otherwise not have this information available, it is possible for targets of interest to the dependent airport to be obscured from the providing airport's radar by line of sight obstructions.

A need exists, therefore, for a reliable, relatively low cost solution to provide an air traffic surveillance system with the capability to locate targets en route, locate targets approaching the airport, locate targets on the ground as a component of a runway incursion system, improve the handover between approach systems and runway incursion systems, and to extend the range and accuracy of target localization utilizing existing air traffic surveillance systems without the need to install antenna elements outside the system boundaries.

SUMMARY OF THE INVENTION

It is an object of the present invention to overcome the problems of the prior art by providing a system and methods for high direction and location finding accuracy utilizing existing air traffic surveillance systems, and without requiring large individual antenna aperture, mechanical antenna rotation, or additional receivers outside the system boundaries.

The invention relates to a system which can be used to perform several methods of target localization. The system includes at least one transmitter for transmitting a signal to a target, and at least one receiver for receiving a return signal from the target to calculate the RTD (Round Trip Delay) of the signal. The system further includes at least three receivers for receiving a return signal from the target and a mechanism for determining the Time of Arrival (TOA) of the signals at each receiver. The system also includes a central processor for calculating TDOAs (Time Difference of Arrivals) and performing the localization calculations in accordance with the methods of the invention as will be described in more detail below.

The methods of the invention calculate at least an estimate of a target's position using TDOA and RTD data obtained from target transponder signals. The TDOAs are calculated by measuring the TOA of a transponder signal from the target when the signal is received at a plurality of receiver units. The receiver utilized to calculate the RTD can also function as one of the three receivers used to calculate the TDOA. Each TOA is subtracted from the TOA of a designated receiver to produce the TDOAs. Transmitting an interrogation signal from a transmitter to a target and measuring the delay time between the time of transmission of the interrogation signal and the time of arrival of the reply signal from the target at a receiver determines the RTD. The RTD data can then be used to calculate the target's precise range. By using the TDOA data in conjunction with the range provided from the RTD data, the range GDOP issues associated with the prior art multilateration technique are overcome and the range accuracies, and therefore the overall position accuracies, improve dramatically.

The method of one embodiment of the present invention calculates azimuth of a target based on TDOA data of transponder replies received by at least three antenna elements (receiving units, "RUs"), which effectively create an antenna array. When the distance of the target is much greater than the baseline, it is possible to use a simple linear approximation that computes the azimuth and elevation. If range only, or range and height are available as well, it is possible to considerably improve the measurement accuracy by performing an azimuth search at the given range and height that best matches the measured TDOA.

The signals received at the ground-based RUs are typically generated by transponders onboard the target aircraft. When the data is received as a function of a response to an interrogation from a ground-based transmitter, the round trip delay of the messages is calculated and stored for use in range calculations.

The received data is processed by the RUs, time stamped with Time of Arrival information (TOA) to be used in Time Differential of Arrival (TDOA) calculations and sent to the processing unit for further evaluation. At the processing unit the data is sorted into distinct clusters, each representing a specific transmission from a distinct target, and evaluated to give an initial approximation of the azimuth. A search function is then performed around the initial azimuth to compensate for non-linear errors. The search function is performed by creating an arc about the initial azimuth at a range calculated from the RTD data and the height calculated from the altitude data provided in the transponder response. The size of the arc is set to approximately twice the size of the antenna baseline. A predetermined number of points along the arc are selected where each point has the same associated RTD as calculated from the transponder reply signal. Calculating the expected TDOA for each selected point on the arc and comparing that expected TDOA to the measured TDOA yields an error. The azimuth associated with the expected TDOA having the minimum error is selected as a more precise azimuth of the target. A more precise plane position of the target is then calculated using the more precise azimuth and the RTD data.

The search function is reiterated a specific number of times using a smaller arc each time, thereby improving the accuracy of the position estimate. If range is unavailable, then this method will compute approximate azimuth and elevation only. The azimuth that yields the smallest error from the search function is selected. Finally, the x and y positions are calculated and the height (z) is included if calculated from the altitude data.

The method according to another embodiment of the invention calculates a two-dimensional position estimate of a target utilizing TOA and RTD information when a transponder signal is received by at least three receivers as previously discussed. In accordance with this embodiment of the present invention, the height of the target is known and used as the z coordinate to improve the position estimate of the target. The height can be calculated from the altitude data provided by the target in the transponder signal or alternately, the height can be known by a determination that the target is on the ground. In accordance with this embodiment, the measured TOAs, target height and calculated range are provided in conjunction with the coordinates of the RUs to a closed form range aided algorithm. This method of the present invention will calculate a two-dimensional (x, y) position estimate of the target and the known height will be used as the z coordinate to provide a three-dimensional position estimate.

The position estimate, target height and the calculated range are then provided to a search function to further improve the position estimate. The search function approximates a new position estimate of the target and calculates TOAs that correspond to the new position estimate. The search function further includes a cost function which measures the error between the TOAs of the original (current) position estimate and the TOAs of the new position estimate. The position estimate that results in the smallest error is selected as the new current position estimate. The search function is reiterated, each time using the position estimate with the smallest error as the new current position estimate until the error is less than or equal to a predetermined minimum.

The method of yet another embodiment of the present invention calculates a three-dimensional position estimate of a target utilizing the TOA and RTD information when a transponder signal is received by at least four receivers as previously discussed. In accordance with this embodiment of the present invention, the height of the target is not known. Therefore, only the measured TOAs and calculated range in conjunction with the coordinates of the RUs are provided to a closed form range aided algorithm. This method of the present invention will calculate a three-dimensional (x, y, z) position estimate of the target directly from the TOA and RTD data.

The three-dimensional position estimate and the calculated range are then provided to a search function to further improve the position estimate. The search function approximates a new position estimate of the target and calculates TOAs that correspond to the new position estimate. The search function further includes a cost function which measures the error between the TOAs of the original (current) position estimate and the TOAs of the new position estimate. The position estimate that results in the smallest error is selected as the new current position estimate. The search function is reiterated, each time using the position estimate with the smallest error as the new current position estimate until the error is less than or equal to a predetermined minimum.

BRIEF DESCRIPTION OF THE DRAWINGS

For a better understanding of the nature and objects of the invention, reference should be made to the following detailed description of preferred modes of practicing the invention, read in connection with the accompanying drawings, in which.

DETAILED DESCRIPTION OF THE INVENTION

Figure 1:
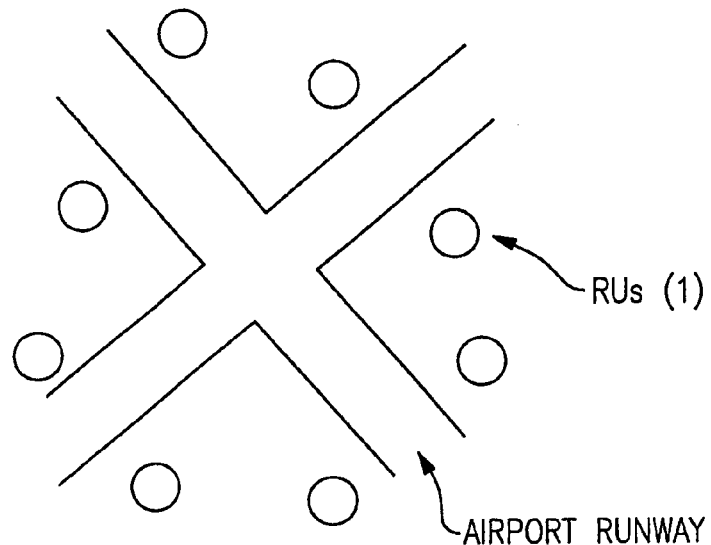
FIG. 1 is a representation of a typical receiving unit (RU) arrangement in an airport.

One embodiment of the present invention will now be described with reference to FIGS. 1–9. A number of antenna elements 1 (hereafter referred to as "receiving units" (RUs)) are placed in known positions within the airport confines to create an antenna array as depicted in FIG. 1. A typical RU is sold by Sensis Corporation (Model No. 100-008121-G001). The distance and placement of the RUs is referred to as the antenna array baseline or baseline. In this embodiment, any combination of at least one transmitter and three receivers is required to provide three-dimensional localization of targets in and around the airport. The RUs can receive only, transmit only, or both transmit and receive. More RUs may be required dependent upon the geography and building layout in and around the airport in order to overcome Line of Sight (LOS) obstructions and multipath issues. In accordance with the present invention, all of the RUs can be positioned within the confines of the airport, thus insuring easy access for maintenance and security, and simplifying communications. In a preferred embodiment, the transmit antenna elements are capable of transmitting a 1030 MHz phase modulated uplink signal and the receive antenna elements are capable of receiving a 1090 MHz amplitude modulated down link signal, however, any signals in space could be used.

Figure 2:
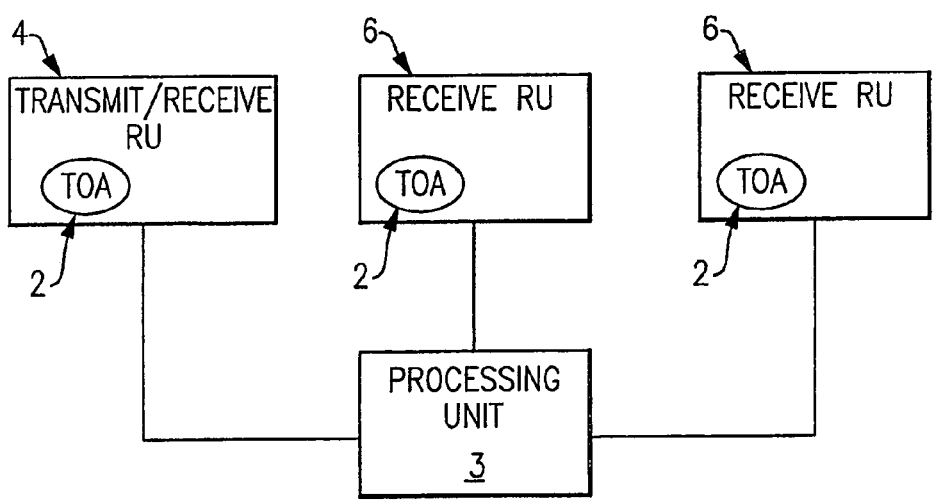
FIG. 2 is a representation of the typical connections between RUs, associated TOA devices and a processing unit.

FIG. 2 shows that each RU 1 includes a TOA device 2 that accurately measures the Time of Arrival (TOA) of each transponder signal received from a target. The RUs 1 are connected by some communication means, such as a local area network (LAN) for example, to a processing unit 3, which performs the localization calculations. Other types of communication means such as Rf links or telephony can also be used and the invention is not thereby limited.

In one sense, the layout of RUs shown in FIG. 1 and the devices shown in FIG. 2 are the same as those employed to locate targets using the traditional multilateration technique. As explained earlier, however, the GDOP associated with the range of the target becomes quite large as the ratio of the antenna baseline (distance between the receivers) to the range of the target decreases. It therefore becomes more difficult to locate the target within the "ellipse of uncertainty" and the effectiveness of the multilateration system is significantly degraded as the distance from the multilateration system to the target increases. In accordance with the present invention, however, range aided position algorithms are used to extend the effective range of the RU infrastructure as shown in FIGS. 1 and 2 to precisely locate the target at significantly increased distances from the system, as will be explained below in more detail.

Figure 3:
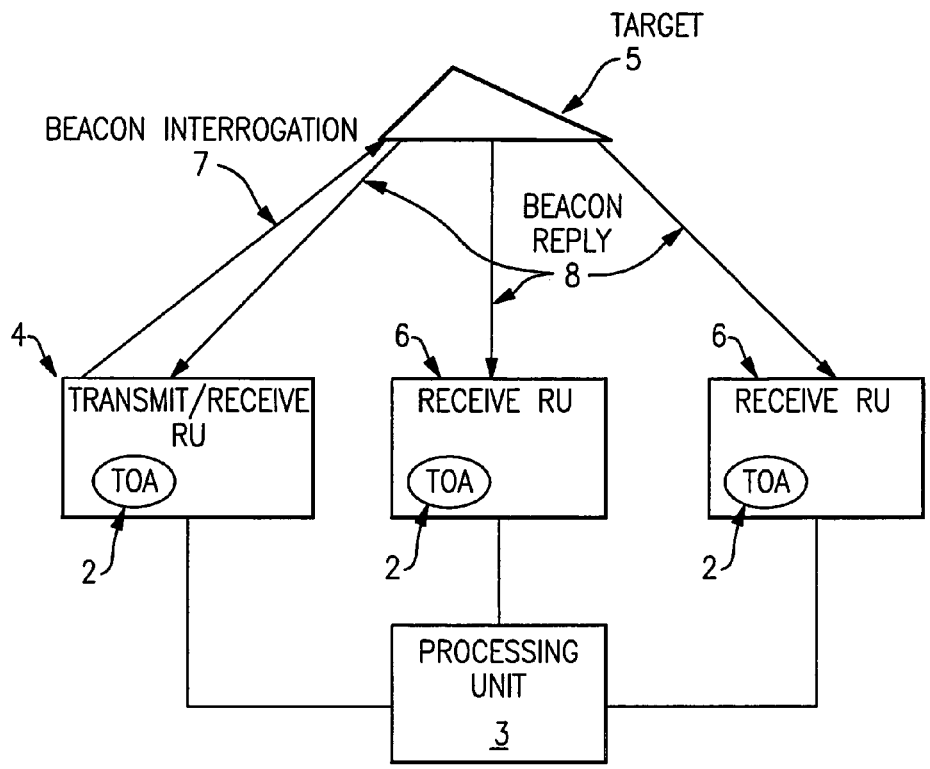
FIG. 3 shows the signal flow that provides TOA data and range calculation using a round trip delay method in accordance with two embodiments of the present invention.

FIG. 3 shows the signal flow between a transmitter/receiver RU 4, a target 5 and two receiver RUs 6. An interrogation signal 7 is sent from the transmitter/receiver RU 4 to solicit a reply 8 from the target's 5 transponder. Transmitter/receiver RU 4 records the time of the transmission of the interrogation signal 7 for later use in calculating the target's range. The transponder inside the target replies automatically within a known amount of time (internal delay) subject to a tolerance as will be described later. The reply signal is received at all of the RUs 4, 6, 6 where the data is decoded and time tagged with its Time of Arrival (TOA) from the TOA device 2. Multiple methods can be used to determine TOA including, but not limited to, Global Positioning System (GPS) data, localized clocks and internal counters. Transponder reply signals contain a wealth of information for use by air traffic control personnel. This information can include, but is not limited to, Mode S address, flight identification number and altitude data, depending on the type of reply solicited. Each RU then sends the data with its time stamp over a data link to the processing unit 3 for further evaluation. Additionally, the transmitter/receiver RU 4 provides the time of transmission of the interrogation signal 7 over the data link to the processing unit 3.

The processing unit clusters the decoded data with each cluster containing a specific transmission received at each RU from a specific target. Clustering is typically performed through target number identification, Mode S address, or Mode 3/A Code; however other proven methods are also available. As will be explained below in more detail, the processing unit then performs calculations utilizing the target data and recorded transmission time of the interrogation signal provided by the RUs to determine the precise location of the target.

Figure 4:
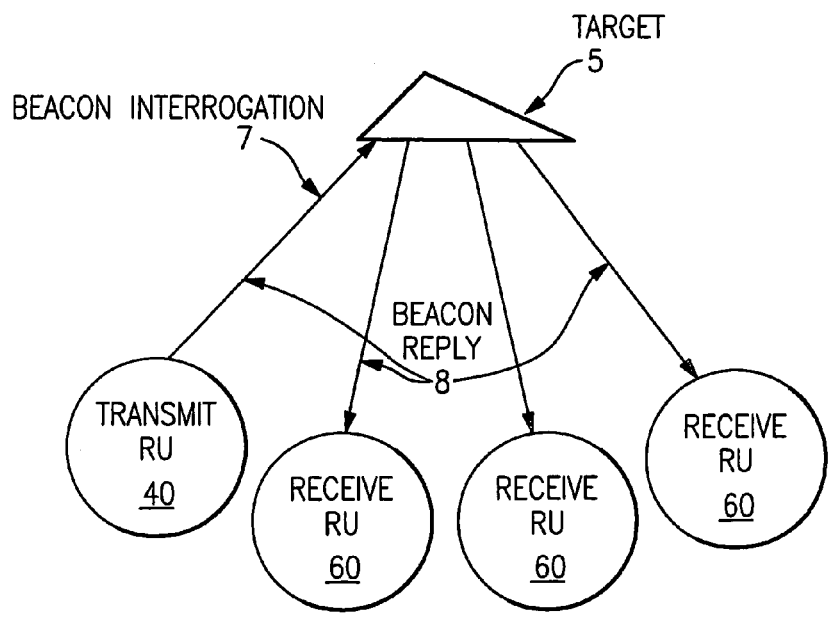
FIG. 4 shows the signal flow in accordance with another embodiment of the present invention when different RUs are utilized for the transmit and receive functions to determine range.

The time that the interrogation was sent from the transmitter/receiver RU 4 to the target is known, as is the internal delay of the target's transponder, and the time of arrival of the target's return signal at transmitter/receiver RU 4. This data is used to calculate the round trip delay to determine the precise range of the target. In a preferred embodiment, the same antenna is used to both transmit and receive the signal used for the range calculation. In this manner, the precise range of the target aircraft can be calculated based only on the round trip delay data by the following formula:

$$R = \frac{RTD - \text{delay}}{2} * c$$

where:
R=Range
RTD=Round trip delay (elapsed time from transmission of interrogation signal to reception of reply signal)
delay=internal delay of target's transponder
c=speed of light In another embodiment, however, as shown in FIG. 4, a transmitter RU 40 could be used in combination with three receiver RUs 60 (i.e., transmission and reception of the signal are not through the same antenna.) If this embodiment is adopted, precise range of the target will be known only after the azimuth of the target is calculated. That is, since the round trip delay is measured from the antenna of transmitter RU 40 to the antenna of one of the receiving RUs 60, the precise range of the target will not be known until the azimuth of the target is calculated as well. In both scenarios shown in FIGS. 3 and 4, however, since the range is calculated from round trip delay data, the GDOP issues associated with the prior art multilateration techniques are overcome and the range accuracies improve dramatically (e.g., for ranges outside of the airport in excess of 20 miles) without any change in the RU infrastructure.

Using round trip delay to calculate target range either alone (FIG. 3) or in combination with the azimuth of the target (FIG. 4) is only one step of the process. The next step requires using the clustered TDOA data for each target. Specifically, the TDOAs between the transponder replies belonging to the same cluster are calculated utilizing the TOA from one RU as a reference, which effectively eliminates time biases. This set of TDOAs will be referred to as measured TDOAs. A first approximation of the azimuth is then calculated by evaluating the measured TDOAs in conjunction with the known positions of the RUs using a linear approximation.

Figure 5:
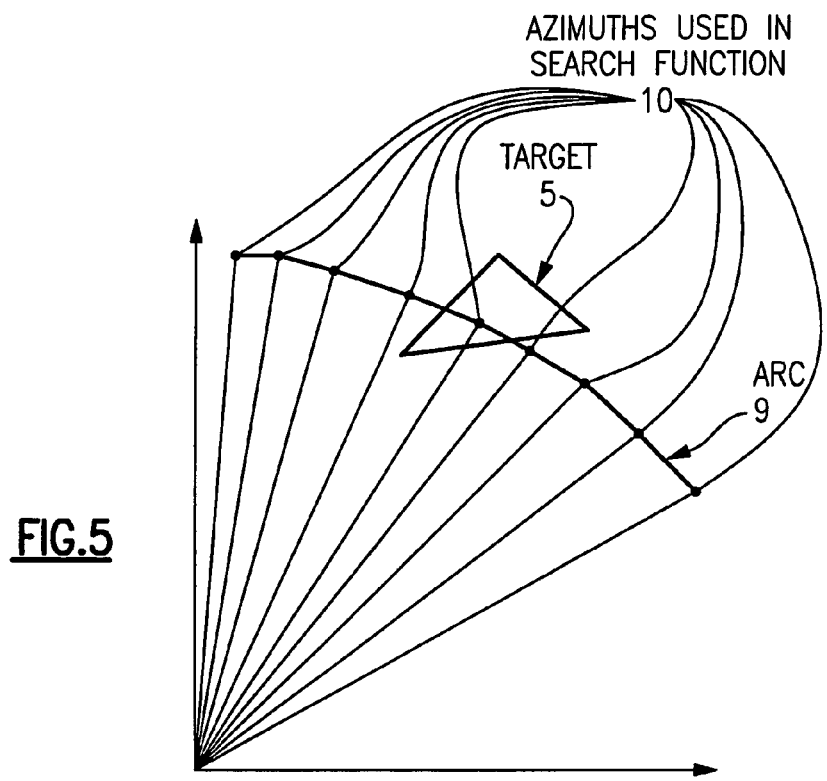
FIG. 5 is a representation of a search function utilized to determine the precise location of the target in accordance with a preferred embodiment of the present invention.

The data is further refined through an azimuth search around the first approximation of the azimuth that best matches the measured TDOA at the measured range and height. The height is calculated from the altitude data included in the transponder reply as is well known in the art. Referring to FIG. 5, an arc 9 is created about the first approximation of the azimuth at the range and height determined from the altitude data from the transponder reply (return signal). In the preferred embodiment of the invention (FIG. 3), the created arc represents a portion of a circle due to the fact that the same antenna was utilized to transmit the interrogation and receive the transponder reply signal for use in the range calculation (based on round trip delay), which greatly simplifies the search. If different antennas are utilized to transmit the interrogation and receive the reply signal (FIG. 4), then the arc will represent a portion of an ellipse. Although this will somewhat complicate the search algorithm, the search can still be performed with little or no degradation in accuracy.

Figure 6:
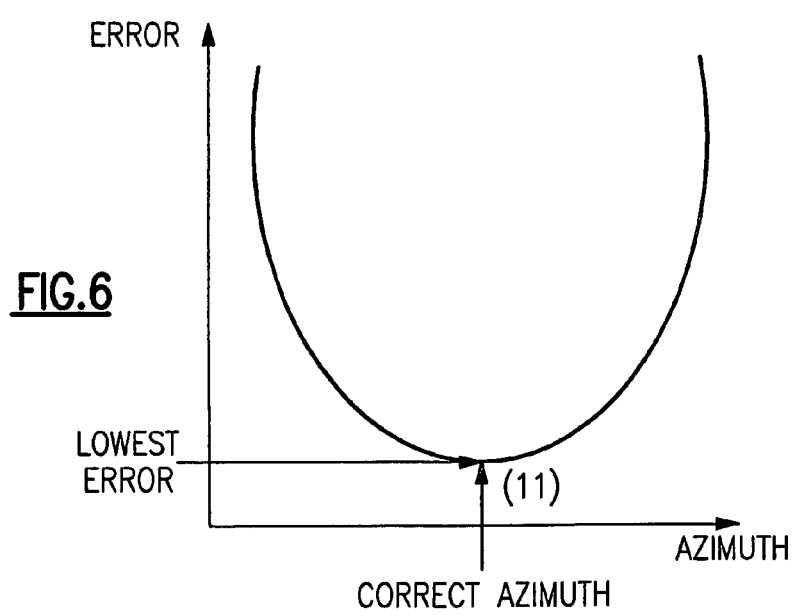
FIG. 6 is a graphical representation of the results of the search function.

By way of example only, the arc is selected to be approximately twice the size of the antenna baseline (distance between the two RUs which are farthest apart), and ten individual points (azimuths) 10, each having the same round trip delay (RTD) as calculated from the return signal, are taken along the arc 9. For each azimuth point in the search, the TDOA is calculated from a known model, described below. This set of TDOAs will be referred to as expected TDOAs. The minimum error between the expected TDOAs and the measured TDOAs is then calculated. As depicted in FIG. 6, the azimuth associated with the expected TDOAs that produces the minimum error 11 is selected. Preferably, the arc is then reduced to a tenth of its original size about the new azimuth and a second set of ten new points is taken on the smaller arc. This process is reiterated a predetermined number of times based upon system parameters including, by way of example, antenna baseline size and the range accuracies of the antennas. The number of iterations is particular to a given system and is determined during system deployment.

Since the precise range is being determined from the round trip delay data and the height is being calculated from the altitude data provided by the transponder response, the search function is performed in one dimension, thereby significantly reducing the complexity as compared to a multilateration type search. Other search function evaluations methods such as Steepest Rate of Descent techniques can be used with results similar in accuracy.

The x, y and z coordinates are then determined from the finally calculated azimuth and range, and the height as calculated from the altitude data in the transponder return signal to provide precise three-dimensional localization of the target. This data is then made available to the air traffic control operators for display.

Figure 7:
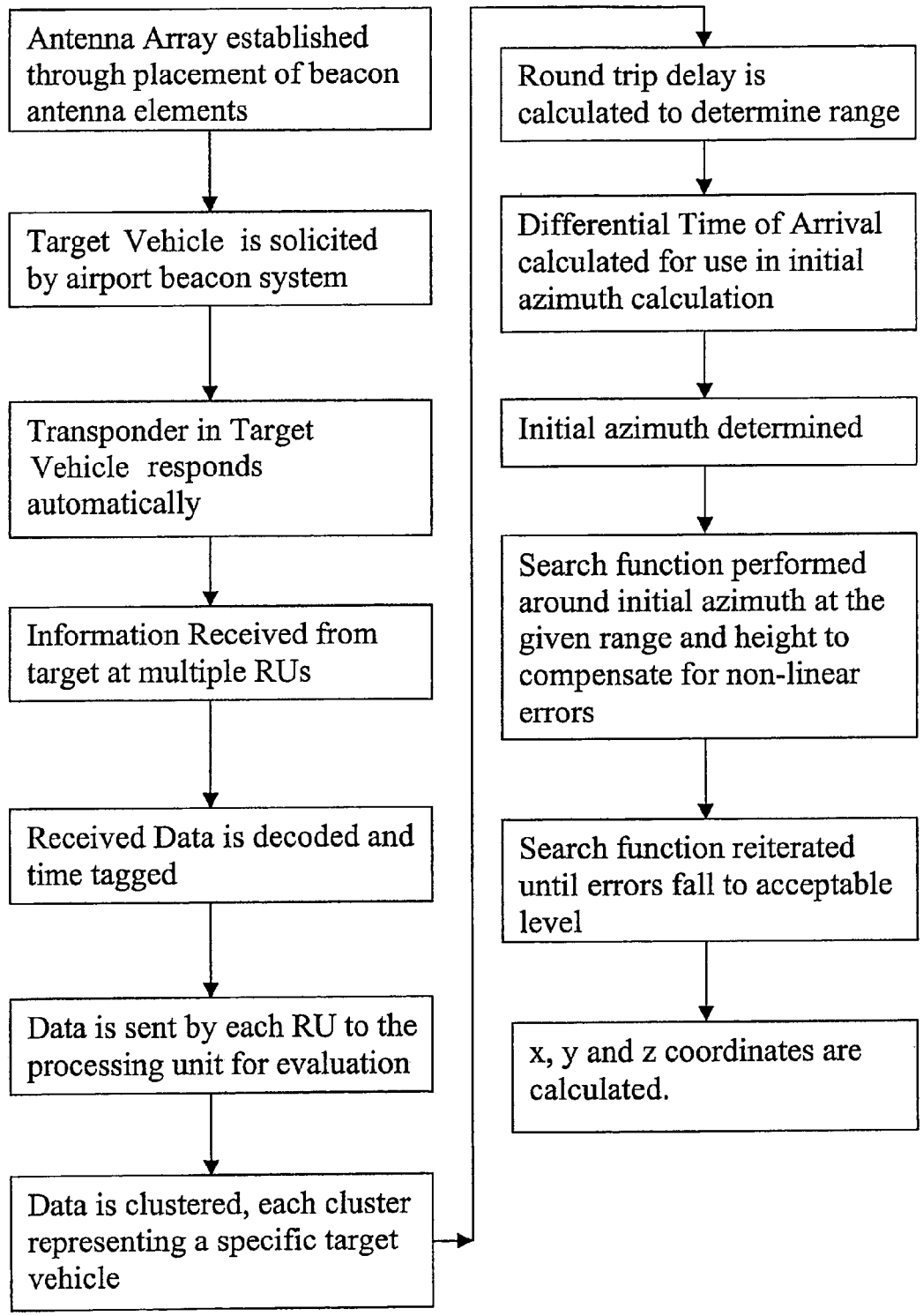
FIG. 7 is a flow diagram of a process used to determine target position in accordance with one embodiment of the present invention.

FIG. 7 shows a flow diagram of the steps in accordance with this embodiment of the present invention. The first step is to arrange a plurality of antenna elements, preferably within the confines of an airport. In a preferred embodiment, at least one of the antenna elements must both transmit and receive the signal (transmitter/receiver RU), whereas the remaining elements can be receiver-only RUs.

The transmitter/receiver RU transmits a signal to the target, and the target transmits a reply signal with known data (e.g., aircraft identification, altitude, etc.). The reply signal is received by either the antenna of the transmitter/receiver RU that transmitted the interrogation signal or another RU antenna. The reply signal is also received by at least two additional RUs. The received data is decoded and time-tagged with the TOA information, and then sent to processing unit 3 where it is clustered and utilized to calculate target range and initial (approximate) azimuth.

In accordance with the preferred embodiment shown in FIG. 3, the reply signal is received through the same antenna that transmitted the interrogation signal such that the round trip delay can be used to provide the precise range of the target. Measured TDOA is then calculated and evaluated to determine the initial azimuth of the target, and thereafter a search function is performed around the initial azimuth to compensate for non-linear errors. The search function is repeated a predetermined number of times based on system parameters. The precise three-dimensional location of the target is then determined (again, the height of the target is determined by the altitude data in the reply signal from the target).

In accordance with this embodiment of the present invention, a specific algorithm is used to determine the initial (approximate) azimuth of the target. Another specific algorithm is used to perform the search function around the initial azimuth and provide a more accurate azimuth for the target. The manner in which those algorithms were developed will now be described.

Figure 8:
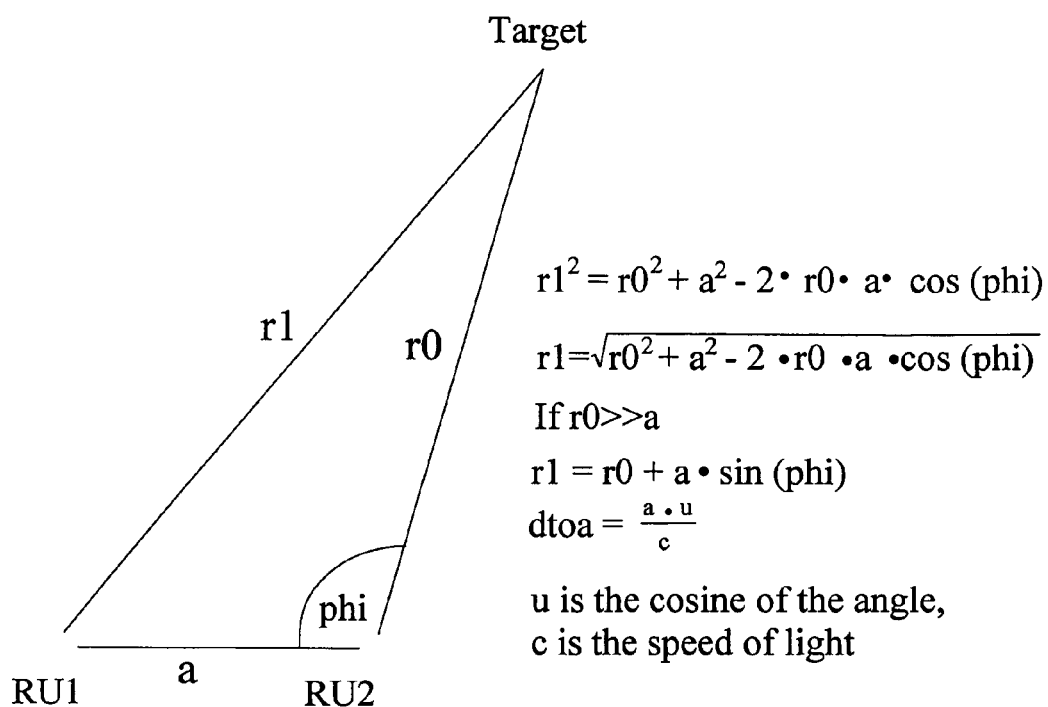
FIG. 8 is a two dimensional representation of a model used to explain an algorithm in accordance with one embodiment of the present invention.

A geometric representation of reply signal reception by two RUs is shown in FIG. 8. The exact expression for the measured TDOA is derived utilizing the cosine theorem as follows:

$$r1^2 = r0^2 + a^2 - 2 \cdot r0 \cdot a \cdot \cos(\text{phi})$$

and $$r1 = \sqrt{r0^2 + a^2 - 2 \cdot r0 \cdot a \cdot \cos(\text{phi})}$$

When developed into a Taylor series it becomes a linear expression for $a \ll r0$:

$$r1 = r0 + a \cdot \cos(\text{phi})$$

and $$r1 - r0 = a \cdot \cos(\text{phi})$$

Note that r1−r0 represents the difference in distance between the target and the respective RUs. The variable u can be directly calculated from the measured TDOA using a simple algebraic operation:

$$u = \frac{tdoa \cdot c}{a}$$

(where u is the cosine of the angle phi and c is the speed of light).

Figure 9:
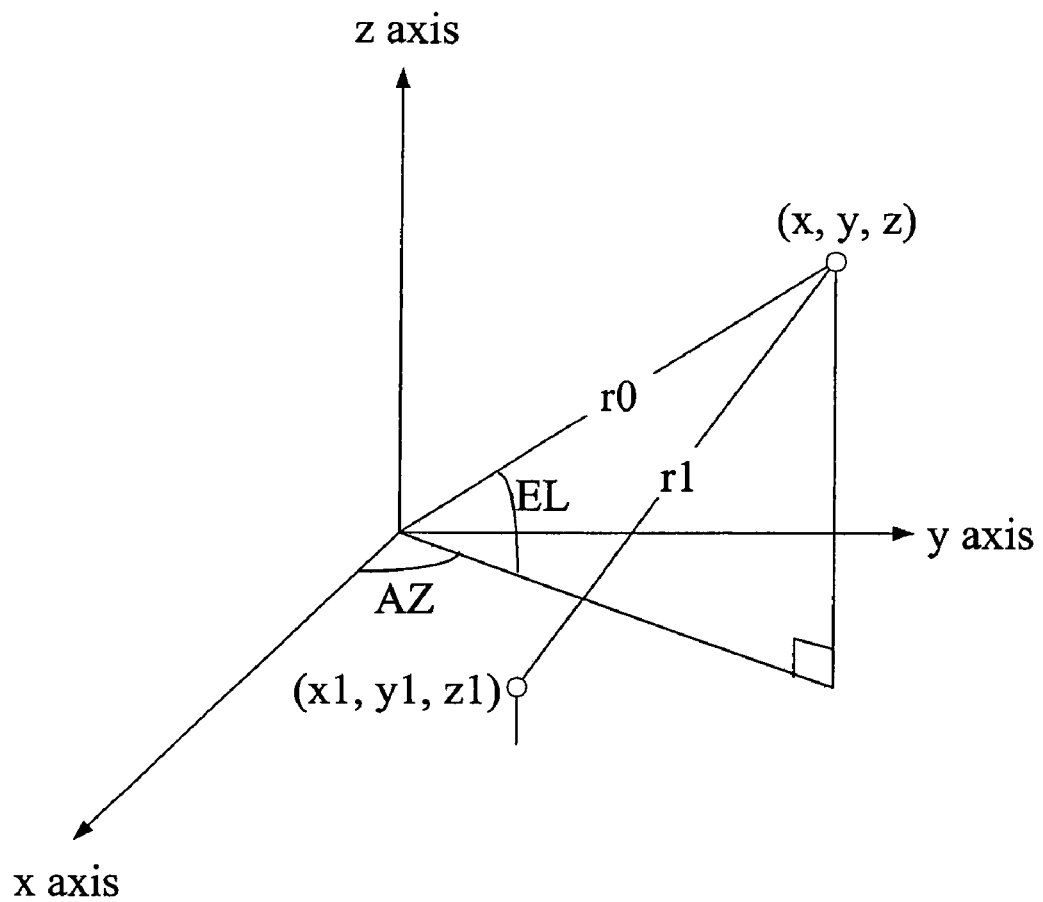
FIG. 9 is a three dimensional representation of a model used to further develop the algorithm in accordance with one embodiment of the present invention.

Using the coordinate system depicted in FIG. 9, this approximation is extended to the three dimensional case as follows:

$$r1 = \sqrt{(x-x1)^2 + (y-y1)^2 + (z-z1)^2} \qquad (1)$$

where:
r1 True range from the target to the RU.
(x, y, z) Coordinates of the target
(x1, y1, z1) Coordinates of the receiving RU.

The target distance from the origin is denoted as r0:

$$r0 = \sqrt{x^2 + y^2 + z^2} \qquad (2)$$

For r0>>(x1, y1, z1) the linear expansion approximation from the appropriate Taylor Series becomes:

$$r = r0 - \frac{x}{r0} \cdot x1 - \frac{y}{r0} \cdot y1 - \frac{z}{r0} \cdot z1 \qquad (3)$$

Denoting $$u = \frac{x}{r0} = \cos(el) \cdot \cos(az) \qquad (4)$$

$$v = \frac{y}{r0} = \cos(el) \cdot \sin(az)$$

$$w = \frac{z}{r0} = \sin(el)$$

(where az and el are azimuth and elevation respectively).

The expression for the distance then becomes:

$$r = r0 - x1 \cdot u - y1 \cdot v - z1 \cdot w \qquad (5)$$

As one skilled in the art can appreciate, evaluating only the linear portion of the Taylor Series will induce non-linear errors but will still give an acceptable first approximation of the azimuth. The impact of these errors will be mitigated through the search function described in detail later.

The TOA to each receiver (RU) is:

$$TOA = \frac{r}{c} + \text{time bias} \qquad (6)$$

The TOA bias exists because the measured TOA is not absolute relative to the time of day.

Using multiple receivers the above equation can be generalized to a matrix form:

$$\begin{pmatrix} TOA1 \\ TOA2 \\ \vdots \\ TOAn \end{pmatrix} = \frac{1}{c} \cdot \begin{pmatrix} x1 & y1 & z1 \\ x2 & y2 & z2 \\ & & \\ xn & yn & zn \end{pmatrix} \cdot \begin{pmatrix} u \\ v \\ w \end{pmatrix} + \text{time bias} \qquad (7)$$

or in a shorter notation:

$$TOA\_vec = \frac{1}{c} ru\_mat\_full \cdot u\_mat + \text{time bias} \qquad (8)$$

(ru_mat_full contains the locations of all receivers), (u_mat is the direction vector in sine space).

The TOA bias is common to all receivers. Therefore, by taking one RU as a reference and subtracting its TOA from all other RUs' TOA, the TOA bias can be eliminated and the measured TDOAs are determined. The first RU to supply the data is typically chosen as the reference RU, however any RU can be used. Therefore, the relevant matrix expression is:

$$\begin{pmatrix} TDOA1 \\ TDOA2 \\ \vdots \\ TDOA_{n-1} \end{pmatrix} = \frac{1}{c} \cdot \begin{pmatrix} x2-x1 & y2-y1 & z2-z1 \\ x3-x1 & y3-y1 & z3-z1 \\ & & \\ x_n-x1 & \cdots & z_n-z1 \end{pmatrix} \cdot \begin{pmatrix} u \\ v \\ w \end{pmatrix} \qquad (9)$$

where $$TDOA1 = TOA2 - TOA1, \ TDOA2 = TOA3 - TOA1, \ldots, \ TDOAn-1 = TOAn - TOA1 \qquad (9.1)$$

The variable w depends on u,v according to:

$$u^2 + v^2 + w^2 = 1 \qquad (10)$$

Therefore, it is sufficient to find u, v only and equation (9) can reduce to:

$$\begin{pmatrix} TDOA1 \\ TDOA2 \\ \vdots \\ TDOA_{n-1} \end{pmatrix} = \frac{1}{c} \cdot \begin{pmatrix} x2-x1 & y2-y1 \\ x3-x1 & y3-y1 \\ & \\ x_n-x1 & \cdots & y_n-y1 \end{pmatrix} \cdot \begin{pmatrix} u \\ v \end{pmatrix} \qquad (11)$$

Equation (11) can be written in a more compact form as:

$$TDOA\_vec = \frac{1}{c} \cdot dru\_mat \cdot u\_vec \qquad (12)$$

The best estimator solution (MMSE or ML) to equation (12) is:

$$u\_vec = c \cdot [dru\_mat^T \cdot dru\_mat]^{-1} \cdot dru\_mat^T \cdot TDOA\_vec \qquad (13)$$

The direction vector in sine space is a multiplication of a fixed matrix that depends on the RU locations and the measured TDOA vector and gives the initial azimuth.

It should be noted that equation (11) ignores the z coordinates of the receivers. This is done in order to maintain the linearity of the equation. The contribution of z to the range from receiver to target is negligible compared to the contribution of x and y. It should also be noted that subsequent steps of the algorithm compensate for z.

Performing a one-dimensional optimization search in azimuth compensates for the non-linear errors. The search is performed by creating an arc about the first approximation of the azimuth at the range and height calculated from the altitude data in the transponder reply signal as previously defined. A predetermined number of points on the arc are selected for evaluation, each selected point having the same round trip delay (RTD) as calculated from the transponder reply signal. It is assumed that the range and the height are constant, as they are given by the transponder reply signal. In the event that height is not available, it is set to zero, and the algorithm will find the coordinate projection on the x-y plane.

To perform the search, the expected TDOA for each azimuth is calculated from the known model depicted in FIG. 9 as follows:

1. The x, y, z of the selected point on the arc is calculated using simple trigonometric equations assuming a circle with a constant RTD for a case of transmitter/receiver using the same antenna, or an ellipse with a constant RTD if the transmitter and receiver are using different antennas.
2. The distance to each RU is calculated using the x, y, z previously calculated on the arc and the known x1, y1, z1 of the selected RU. This step is repeated for each RU.
3. The expected TOA at each RU is calculated by dividing the distance by the speed of light (c).
4. The TOA of the reference RU (the reference RU is the same one chosen to calculate the measured TDOA) is subtracted from the TOAs of each individual RU.
5. The result is the expected TDOA vector to be used in evaluating the search function.

The following cost function is then evaluated for the azimuth search:

$$\varepsilon_i = \sum_{j=1}^{nru-1} [\text{tdoa\_meas}_j - \text{tdoa\_expected}(az_{i,j}, R, H)]^2 \quad (14)$$

where:
tdoa_meas$_j$ Measured TDOA in RU # j
tdoa_expected($az_{i,j}$,R,H) Expected TDOA in the $i^{th}$ azimuth for RU #j The range R and height H are held constant, equal to information derived from the transponder reply signal. The function is calculated over i points (e.g., 10), where each point has the same round trip delay (RTD) as calculated from the transponder reply signal as previously mentioned, and the azimuth associated with the expected TDOA that produces the lowest error is selected. In the event that height is not available, it is set to zero, and the algorithm will find the coordinate projection on the x-y plane. The search function is repeated by creating a new smaller arc (e.g., one-tenth the size of the original arc) about the new azimuth (i.e., that produced the lowest error). The cost function is then repeated over a second i points (e.g., 10). Again the azimuth associated with the expected TDOA that produces the lowest error is selected. This search function process is repeated a predetermined number of times, as previously discussed, with the final azimuth producing the lowest TDOA error from the cost function.

Dividing the height by the range calculated from the RTD data and taking the inverse-sine of the result gives the elevation of the target. Once the elevation and optimal azimuth have been determined, the three-dimensional coordinates are calculated as follows:

$x = R \cdot \cos(az\_c) \cdot \cos(el)$ $y = R \cdot \sin(az\_c) \cdot \cos(el)$ $z = \text{Height}$ \quad (15)

where:
R=Measured range
az_c=Optimal azimuth as calculated by the search process
Height=Calculated from altitude data in transponder reply.

If height cannot be calculated from the transponder reply, it is set to zero and only the x and y coordinates are calculated.

If a transponder signal is received that is not in response to an interrogation from an RU, then range cannot be determined from the RTD information. In some instances of this scenario, the height may be unavailable as well, as the signal from the target does not include altitude data. If height and range are not available, then this method will compute approximate azimuth and elevation directly from equation (13). The accuracy will depend on the ratio between the antenna baseline and range, and will improve as the range increases. Another approximation is the z dimension of the antenna array. The approximation will improve if the z dimension of the antenna array decreases relative to the baseline.

An identical method for radar target localization can be employed if one RU is used as a radar transmitter and multiple RUs as radar receivers. As previously described, range can be calculated from the round trip delay and azimuth from the TDOA information.

Another embodiment of the present invention will now be described with reference to FIGS. 1–3 and 10. As in the first embodiment, a number of RUs are placed in known positions within the airport confines as shown in FIG. 1 and any combination of at least three receivers and one transmitter is required to provide three-dimensional localization of targets in and around the airport where the RUs can receive only, transmit only, or both transmit and receive.

As in the first embodiment each RU includes a TOA device 2 to provide an accurate time stamp of the Time of Arrival (TOA) of each transponder signal received from a target. The RUs 1 are connected by a communication means to a processing unit 3. The signal flow between a transmitter/receiver RU 4 a target 5 and two receiver RUs 6 is as shown in FIG. 3. The interrogation signal 7 is sent from the transmitter/receiver RU 4 to solicit a reply 8 from the target's 5 transponder. Transmitter/receiver RU 4 records the time of the transmission of the interrogation signal 7 for later use in calculating the target's range. The transponder inside the target replies automatically within a known amount of time subject to a tolerance as will be described later. The reply signal is received at all of the RUs 4, 6, 6 where the data is decoded and time tagged with its Time of Arrival (TOA) from the TOA device 2. Each RU then sends the data with its time stamp over a data link to the processing unit 3 for further evaluation. Additionally, the transmitter/receiver RU 4 provides the time of transmission of the interrogation signal 7 over the data link to the processing unit 3.

The processing unit clusters the decoded data with each cluster containing a specific transmission received at each RU from a specific target. Clustering is typically performed through target number identification, Mode S address, or Mode 3/A Code; however other proven methods are also available. As will be explained below in more detail, the processing unit then performs calculations utilizing the target data and recorded transmission time of the interrogation signal provided by the RUs to determine the precise location of the target.

When the target's height is known, a two-dimensional (x, y) position estimate of the target can be calculated and the height used as the z coordinate to provide a three-dimensional estimate. The height can be calculated from the altitude data provided by the target in the transponder reply signal or alternately, the height can be known by a determination that the target is on the ground. In any case, the final output of the range aided algorithms of this embodiment of the present invention is a precise x, y, z position of the target as the provided height is used to supply the z coordinate.

The next step is to determine whether the target's range can be used in the position estimate calculation. The range is calculated by the range formula previously disclosed. A range threshold check is performed to determine if the calculated range can be used. The range threshold check is required due to the variations in the signal processing time of the interrogation signal 7 by the target's transponder. Processing times in the transponders that produce the reply signal are subject to a tolerance of as much as ±0.5 μsec from the nominal value, which can result in errors in range of approximately 250 feet. These errors become negligible in distances further from the airport, however, for closer targets these errors become prohibitive due to the ratio between the error and the target's range. Therefore, when the target is within a predetermined range of the airport it is desirable to calculate the target's position without using the range calculated from the RTD data. The range threshold is determined at system deployment and provided to the processing unit 3.

To determine the target's two-dimensional position using the range calculated from the RTD data, the coordinates of the RUs that received the signals, the measured TOAs, the provided height, the calculated range and the RU from which the range was measured are input to the Two-Dimensional Closed Form Range Aided Algorithm of the present invention. The Two-Dimensional Closed Form Range Aided Algorithm provides an estimate of the target's position in a Cartesian coordinate system as x, y, z data using the provided height as the z coordinate.

The algorithm first orders the RU coordinates and their associated TOAs so as to set $RU_1$ in the algorithm as the RU from which the range is measured. This is significant in that the TOAs from the remaining RUs are then subtracted from the TOA of $RU_1$ for calculating the Time Differential of Arrivals (TDOAs) used to calculate the position estimate. The coordinates of the RUs are then translated such that $RU_1$ is at the origin of the Cartesian coordinate system and the distance from the remaining RUs to the new origin ($RU_1$) is calculated. A matrix of RU position values is developed and a new vector that combines the TDOAs and the RU ranges is calculated from which the position estimate is directly available. The position estimate at this point is in a Cartesian coordinate system with $RU_1$ at the origin so it is necessary to translate back to the original Cartesian coordinate system with the system center at the origin for the final position estimate of the target in x, y, z form with the provided height used as the z coordinate.

The position estimate from the Two-Dimensional Closed Form Range Aided Algorithm is further refined through the Two-Dimensional MLE (Maximum Likelihood Position Estimate) Range Aided Algorithm. The Two-Dimensional MLE Range Aided Algorithm requires, as inputs, the initial position estimate of the target (with the height used as the z coordinate), coordinates of the RUs, associated measured TOAs, range measurement and RU from which the range was measured ($RU_1$). The Two-Dimensional MLE Range Aided Algorithm is an iterative solution that continuously approximates a new position estimate and calculates expected TOAs corresponding to the new position estimates. The Two-Dimensional MLE Range Aided Algorithm further includes a cost function that measures the error between calculated TOAs and the measured TOAs. For the position estimate calculation, the cost function is defined to be the norm between expected TOAs corresponding to the position estimate and the measured TOAs with the range measurement included as will be more specifically described later. Other search function evaluation methods such as the Newton-Raphson Method and Simplex Downhill Method can be used with results similar in accuracy.

Figure 10:
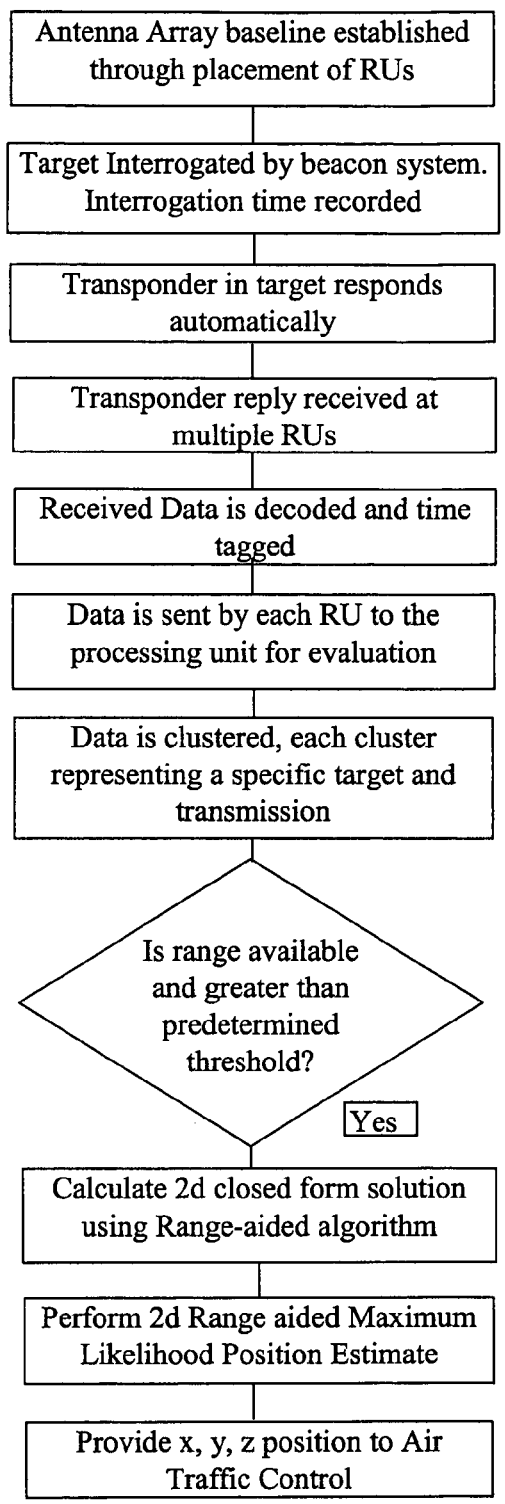
FIG. 10 is a flow diagram of another process used to determine target position in accordance with another embodiment of the present invention.

FIG. 10 shows a flow diagram of the steps in accordance with this embodiment of the present invention. The first step is to arrange a plurality of antenna elements (RUs), preferably within the confines of an airport. At least one of the antenna elements must be both transmit and receive capable (transmitter/receiver RU), whereas the remaining elements can be receiver-only RUs.

The transmitter/receiver RU transmits an interrogation signal to the target and records the time of transmission. The target's transponder transmits a reply signal with known data (e.g., Mode S address, aircraft identification, altitude, etc.). The RU that transmitted the interrogation signal and at least two additional RUs not subject to line of sight or multipath issues receive the reply. The received data is decoded and time-tagged with the TOA information. The received data, TOA, and recorded transmission time of the interrogation signal are then sent to processing unit 3. The processing unit 3 clusters the target data such that a cluster contains information from a single transmission by the same target received by multiple RUs.

To calculate the two-dimensional position estimate, a determination is first made whether to utilize the range calculated from the RTD data to improve the accuracy of the position estimate. If the determination is made to utilize the range in the calculation, then a two-dimensional position estimate is calculated using the Two-Dimensional Closed Form Range Aided Algorithm of the present invention. The calculated two-dimensional position estimate is further refined through the Two-Dimensional MLE Range Aided Algorithm with the provided height used for the z coordinate as previously discussed.

The two-dimensional range aided algorithms will now be described in detail.

Two-Dimensional Closed Form Range Aided Algorithm

The inputs to the Two-Dimensional Closed Form Range Aided Algorithm include:
  RU coordinates
  Associated measured TOAs
  Z component of target position z'
  Measured range (R)
  RU from which Range was measured ($RU_r$)

The output of the Two-Dimensional Closed Form Range Aided Algorithm is an estimate of the target's position.

The first step is to order the RU coordinates and their associated TOAs in the algorithm such that $RU_1$ is the RU from which the range is measured. The next step is to calculate TDOAs using the first TOA (from $RU_1$) as the reference:

$$d_1 = t_1 - t_2$$

$$d_2 = t_1 - t_3$$

Next, the RU coordinates are translated such that $RU_1$ is at the origin:

$$x_2 = x_2' - x_1'$$

$$y_2 = y_2' - y_1'$$

$$z_2 = z_2' - z_1'$$

$$x_3 = x_3' - x_1'$$

$$y_3 = y_3' - y_1'$$

$$z_3 = z_3' - z_1'$$

$$z = z' - z_1'$$

Next, the distance from the RUs to the origin in the translated coordinate system is calculated:

$$R_2 = \sqrt{x_2^2 + y_2^2 + z_2^2}$$

$$R_3 = \sqrt{x_3^2 + y_3^2 + z_3^2}$$

Then a matrix of RU coordinate values is developed:

$$A = \begin{bmatrix} -2x_2 & -2y_2 \\ -2x_3 & -2y_3 \end{bmatrix}^{-1}$$

Note that the elements of the above matrix are later referred to by $A_{ij}$ where (i,j) are the row and column respectively.

Next, a new vector combining the TDOAs and the RU ranges is developed:

$$b_1 = d_1^2 - R_2^2 - 2d_1 R + 2zz_2$$

$$b_2 = d_2^2 - R_3^2 - 2d_2 R + 2zz_3$$

From here the two-dimensional position estimate of the target is calculated:

$$xp_1 = A_{11}(b_1 - 2d_1 R) + A_{12}(b_2 - 2d_2 R)$$

$$yp_1 = A_{21}(b_1 - 2d_1 R) + A_{22}(b_2 - 2d_2 R)$$

Recall that the coordinates of the RUs were translated at the beginning of the process such that $RU_1$ was at the origin. Therefore it is necessary to translate the position estimate to the original coordinate system for the final position estimate:

$$x_i = xp_1 + x_1'$$

$$y_i = yp_1 + y_1'$$

$$z_i = z$$

The output of the Two-Dimensional Closed Form Range Aided Algorithm is the position estimate $(x_i, y_i, z_i)$.

Two-Dimensional MLE Range Aided Algorithm

The input to the Two-Dimensional MLE Range Aided Algorithm consist of:

RU coordinates
Associated measured TOAs
Initial Position Estimate $(x_i, y_i, z_i)$
Range Measurement $(R_m)$
RU from which measured range The output from the Two-Dimensional MLE Range Aided Algorithm is a precise location of the target in x, y, z form.

Again, the first step is to order the RUs in the algorithm such that $RU_1$ is the RU from which the range was measured. The Two-Dimensional MLE Range Aided Algorithm is an iterative solution that requires an initial guess ($x_i, y_i, z_i$ position estimate) to start and continuously approximates a new position estimate. Expected TOAs are calculated for each new position estimate and the cost function of the Two-Dimensional MLE Range Aided Algorithm measures the error between the calculated TOAs and the measured TOAs. For calculation of the final position, the cost function is defined to be the norm of the difference between the expected TOAs derived from the current position estimate $(x_i, y_i, z_i)$ and the measured TOAs. Again, the range is included to improve the accuracy of the final calculated position of the target. The Two-Dimensional MLE Range Aided Algorithm is iterated until subsequent estimates are sufficiently close together that the cost function returns a value equal to or less than a predetermined value.

$$f(x, y, z, t_1, t_2, \ldots, t_N, R_m) = \begin{bmatrix} \sqrt{(x-x_2)^2 + (y-y_2)^2 + (z-z_2)^2} - \sqrt{x^2+y^2+z^2} - c(t_2 - t_1) \\ \vdots \\ \sqrt{(x-x_N)^2 + (y-y_N)^2 + (z-z_N)^2} - \sqrt{x^2+y^2+z^2} - c(t_N - t_1) \\ \sqrt{x^2+y^2+z^2} - R_m \end{bmatrix}$$

$$F(x, y, z, t_1, t_2, \ldots, t_N) = \left\| \begin{matrix} \sqrt{(x-x_2)^2 + (y-y_2)^2 + (z-z_2)^2} - \sqrt{x^2+y^2+z^2} - c(t_2 - t_1) \\ \vdots \\ \sqrt{(x-x_N)^2 + (y-y_N)^2 + (z-z_N)^2} - \sqrt{x^2+y^2+z^2} - c(t_N - t_1) \\ \sqrt{x^2+y^2+z^2} - R_m \end{matrix} \right\|$$

$$= f_1^2 + f_2^2 + \ldots + f_{N-1}^2 + f_N^2$$

The MLE changes the estimate $(x_i, y_i, z_i)$ until the function $f$ is minimized.

Another embodiment of the present invention will now be described with reference to FIGS. 1–2 and 11–12. As in the previous embodiments, a number of RUs are placed in known positions within the airport confines as shown in FIG. 1. However, in this embodiment any combination of at least four receivers and one transmitter is required to provide three-dimensional localization of targets in and around the airport. Again, the RUs can receive only, transmit only, or both transmit and receive and additional RUs may be required to overcome Line of Sight (LOS) obstructions and multipath issues.

Figure 11:
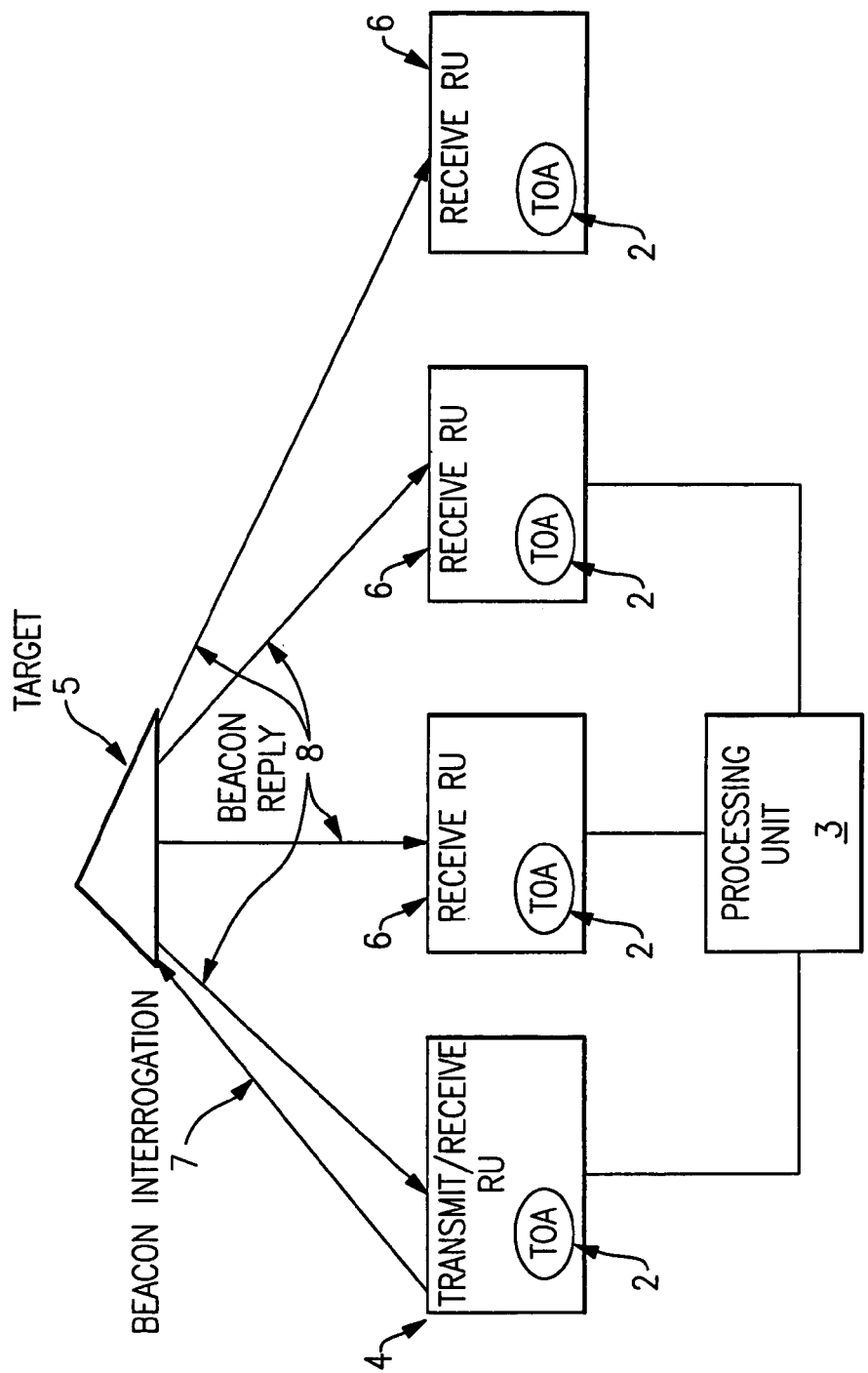
FIG. 11 shows the signal flow that provides TOA data and range calculation using a round trip delay method in accordance with another embodiment of the present invention.

As in the previous embodiments each RU includes a TOA device 2 to provide an accurate time stamp of the Time of Arrival (TOA) of each transponder signal received from a target. The RUs 1 are connected by a communication means to a processing unit 3. The signal flow between a transmitter/receiver RU 4 a target 5 and three receiver RUs 6 is shown in FIG. 11. The interrogation signal 7 is sent from the transmitter/receiver RU 4 to solicit a reply 8 from the target's 5 transponder. Transmitter/receiver RU 4 records the time of the transmission of the interrogation signal 7 for later use in calculating the target's range. The transponder inside the target replies automatically within a known amount of time subject to a tolerance as previously described. The reply signal is received at all of the RUs 4, 6, 6, 6 where the data is decoded and time tagged with its Time of Arrival (TOA) from the TOA device 2. Each RU then sends the data with its time stamp over a data link to the processing unit 3 for further evaluation. Additionally, the transmitter/receiver RU 4 provides the time of transmission of the interrogation signal 7 over the data link to the processing unit 3.

The processing unit clusters the decoded data with each cluster containing a specific transmission received at each RU from a specific target. Clustering is typically performed through target number identification, Mode S address, or Mode 3/A Code; however other proven methods are also available. As will be explained below in more detail, the processing unit then performs calculations utilizing the target data and recorded transmission time of the interrogation signal provided by the RUs to determine the precise location of the target.

The next step is to determine whether the target's range can be used in the position estimate calculation. A range threshold check is performed due to variations in the processing times of the target's transponder as previously described. To determine the target's three-dimensional position using the range calculated from the RTD data in accordance with this embodiment of the present invention, the coordinates of the RUs that received the signals, the measured TOAs, the calculated range and the RU from which the range was measured are input to the Three-Dimensional Closed Form Range Aided Algorithm of the present invention. The Three-Dimensional Closed Form Range Aided Algorithm provides an estimate of the target's position in a Cartesian coordinate system as x, y, z data and is similar to the Two-Dimensional Closed Form Range Aided Algorithm as will be seen in the following description.

The algorithm first orders the RU coordinates and their associated TOAs so as to set $RU_1$ in the algorithm as the RU from which the range is measured. This is significant in that the TOAs from the remaining RUs are then subtracted from the TOA of $RU_1$ for calculating the Time Differential of Arrivals (TDOAs) used to calculate the position estimate. The coordinates of the RUs are then translated such that $RU_1$ is at the origin of the Cartesian coordinate system and the distance from the remaining RUs to the new origin ($RU_1$) is calculated. A matrix of RU position values is developed and a new vector that combines the TDOAs and the RU ranges is calculated from which the position estimate is directly available. The position estimate at this point is in a Cartesian coordinate system with $RU_1$ at the origin so it is necessary to translate back to the original Cartesian coordinate system with the system center at the origin for the final position estimate of the target in x, y, z form.

The position estimate from the Three-Dimensional Closed Form Range Aided Algorithm is further refined through the Three-Dimensional MLE (Maximum Likelihood Position Estimate) Range Aided Algorithm. The Three-Dimensional MLE Range Aided Algorithm requires, as inputs, the initial position estimate of the target, coordinates of the RUs, associated measured TOAs, range measurement and RU from which the range was measured ($RU_1$). The Three-Dimensional MLE Range Aided Algorithm is an iterative solution that continuously approximates a new position estimate and calculates expected TOAs corresponding to the new position estimates. The Three-Dimensional MLE Range Aided Algorithm further includes a cost function that measures the error between calculated TOAs and the measured TOAs. For the position estimate calculation, the cost function is defined to be the norm between expected TOAs corresponding to the position estimate and the measured TOAs with the range measurement included as will be more specifically described later. Other search function evaluation methods such as the Newton-Raphson Method and Simplex Downhill Method can be used with results similar in accuracy.

Figure 12:
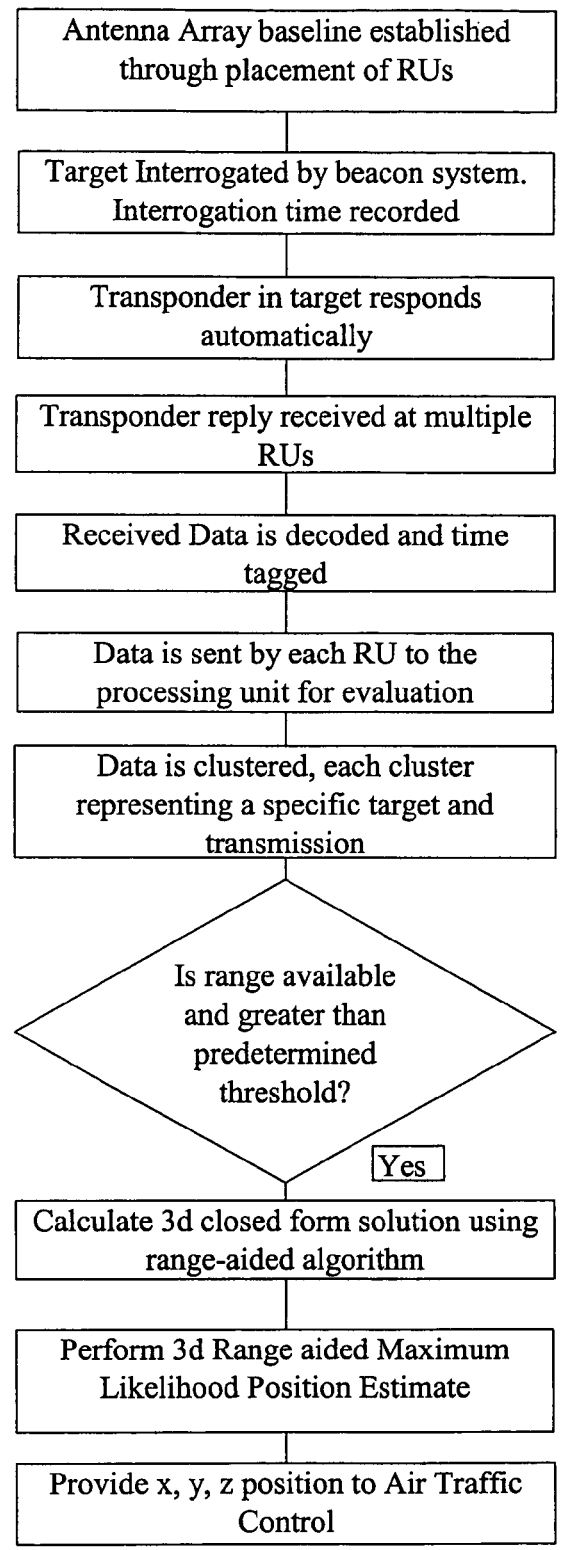
FIG. 12 is a flow diagram of another process used to determine target position in accordance with another embodiment of the present invention.

FIG. 12 shows a flow diagram of the steps in accordance with this embodiment of the present invention. The first step is to arrange a minimum of four antenna elements (RUs), preferably within the confines of an airport. At least one of the antenna elements must be both transmit and receive capable (transmitter/receiver RU), whereas the remaining elements can be receiver-only RUs.

The transmitter/receiver RU transmits an interrogation signal to the target and records the time of transmission. The target's transponder transmits a reply signal with known data (e.g., Mode S address, aircraft identification, altitude, etc.). The RU that transmitted the interrogation signal and at least three additional RUs not subject to line of sight or multipath issues receive the reply. The received data is decoded and time-tagged with the TOA information. The received data, TOA, and recorded transmission time of the interrogation signal are then sent to processing unit 3. The processing unit 3 clusters the target data such that a cluster contains information from a single transmission by the same target received by multiple RUs.

To calculate the three-dimensional position, a determination is first made whether to utilize the range calculated from the RTD data to improve the accuracy of the position estimate. If the determination is made to utilize the range in the calculation then the three-dimensional position estimate is calculated using the Three-Dimensional Closed Form Range Aided Algorithm of the present invention. The three-dimensional position estimate is further refined through the Three-Dimensional MLE Range Aided Algorithm.

The three-dimensional range aided algorithms will now be described in detail.

Three-Dimensional Closed Form Range Aided Algorithm

The inputs to the Three-Dimensional Closed Form Range Aided Algorithm include:
RU coordinates
Associated measured TOAs
Measured range (R)
RU from which Range was measured ($RU_r$)

The output from the Three-Dimensional Closed Form Range Aided Algorithm is an estimate of the target's position.

The first step is to order the RU coordinates and their associated TOAs in the algorithm such that $RU_1$ is the RU from which the range is measured. The next step is to calculate Time Difference of Arrivals (TDOAs) using the first Time of Arrival (from $RU_1$) as the reference:

$d_1 = t_1 - t_2$ $d_2 = t_1 - t_3$ $d_3 = t_1 - t_4$

Next, the RU coordinates are translated such that $RU_1$ is at the origin:

$x_2 = x_2' - x_1'$ $y_2 = y_2' - y_1'$ $z_2 = z_2' - z_1'$ $x_3 = x_3' - x_1'$ $y_3 = y_3' - y_1'$ $z_3 = z_3' - z_1'$ $x_4 = x_4' - x_1'$ $y_4 = y_4' - y_1'$ $z_4 = z_4' - z_1'$

Next, the distance from the RUs to the origin in the translated coordinate system is calculated:

$R_2 = \sqrt{x_2^2 + y_2^2 + z_2^2}$ $R_3 = \sqrt{x_3^2 + y_3^2 + z_3^2}$ $R_4 = \sqrt{x_4^2 + y_4^2 + z_4^2}$ Then a matrix of RU coordinate values is developed:

$$A = \begin{bmatrix} -2x_2 & -2y_2 & -2z_2 \\ -2x_3 & -2y_3 & -2z_3 \\ -2x_4 & -2y_4 & -2z_4 \end{bmatrix}^{-1}$$

Note that the elements of the above matrix are later referred to by $A_{ij}$ where (i,j) are the row and column respectively.

Next, a new vector combining the TDOAs and the RU ranges is developed:

$b_1 = d_1^2 - R_2^2 - 2d_1R$ $b_2 = d_2^2 - R_3^2 - 2d_2R$ $b_3 = d_3^2 - R_4^2 - 2d_3R$

From here the three-dimensional position estimate of the target is calculated:

$xp_1 = A_{11}(b_1 - 2d_1R) + A_{12}(b_2 - 2d_2R) + A_{13}(b_3 - 2d_3R)$ $yp_1 = A_{21}(b_1 - 2d_1R) + A_{22}(b_2 - 2d_2R) + A_{23}(b_3 - 2d_3R)$ $zp_1 = A_{31}(b_1 - 2d_1R) + A_{32}(b_2 - 2d_2R) + A_{33}(b_3 - 2d_3R)$

Recall that the coordinates of the RUs were translated at the beginning of the process such that $RU_1$ was at the origin. Therefore it is necessary to translate the position estimate to the original coordinate system for the final position estimate:

$x_i = xp_1 + x_{1'}$ $y_i = yp_1 + y_{1'}$ $z_i = zp_1 + z_{1'}$

The output of the Three-Dimensional Closed Form Range Aided Algorithm is the position estimate $(x_i, y_i, z_i)$ of the target.

Three-Dimensional MLE Range Aided Algorithm

The inputs to the Three-Dimensional MLE Range Aided Algorithm consist of:
RU coordinates
Associated measured TOAs
Initial Position Estimate $(x_i, y_i, z_i)$
Range Measurement $(R_m)$
Associated RU from which range was measured The output from the Three-Dimensional MLE Range Aided Algorithm is a precise location of the target in x, y, z form.

As with the Three-Dimensional Closed Form Range Aided Algorithm, the first step is to order the RUs in the algorithm such that $RU_1$ is the RU from which the range is measured. The Three-Dimensional MLE Range Aided Algorithm is an iterative solution that requires an initial guess ($x_i$, $y_i$, $z_i$ position estimate) to start and continuously approximates a new position estimate. Expected TOAs are calculated for each new position estimate and the cost function of the Three-Dimensional MLE Range Aided Algorithm measures the error between the calculated TOAs and the measured TOAs. For the calculation of the final position, the cost function is defined to be the norm of the difference between the expected TOAs derived from the current position estimate ($x_i$, $y_i$, $z_i$) and the measured TOAs. The range is included to improve the accuracy of the final calculated position of the target. The Three-Dimensional MLE Range Aided Algorithm is iterated until subsequent estimates are sufficiently close together that the cost function returns a value equal to or less than a predetermined minimum:

$$f(x, y, z, t_1, t_2, \ldots, t_N, R_m) = \begin{bmatrix} \sqrt{(x-x_2)^2 + (y-y_2)^2 + (z-z_2)^2} - \sqrt{x^2 + y^2 + z^2} - c(t_2 - t_1) \\ \vdots \\ \sqrt{(x-x_N)^2 + (y-y_N)^2 + (z-z_N)^2} - \sqrt{x^2 + y^2 + z^2} - c(t_N - t_1) \\ \sqrt{x^2 + y^2 + z^2} - R_m \end{bmatrix}$$

-continued $$F(x, y, z, t_1, t_2, \ldots, t_N) = \left\| \begin{array}{c} \sqrt{(x-x_2)^2 + (y-y_2)^2 + (z-z_2)^2} - \sqrt{x^2+y^2+z^2} - c(t_2-t_1) \\ \vdots \\ \sqrt{(x-x_N)^2 + (y-y_N)^2 + (z-z_N)^2} - \sqrt{x^2+y^2+z^2} - c(t_N-t_1) \\ \sqrt{x^2+y^2+z^2} - R_m \end{array} \right\|$$

$$= f_1^2 + f_2^2 + \ldots + f_{N-1}^2 + f_N^2$$

The MLE changes the estimate $(x_i, y_i, z_i)$ until the function $f$ is minimized.

As can be seen, this invention can be particularly useful to airports that do not have, and cannot afford an expensive radar system. Additionally, this invention can be used to greatly extend the effective range of current air traffic surveillance systems without the requirement of additional transmitting antennas or RUs placed outside the system boundaries.

While the present invention has been particularly shown and described with reference to the drawings and tables included herein, it will be understood by one skilled in the art that various changes in detail may be effected therein without departing from the spirit and scope of the invention as defined by the claims.

We claim:

1. A method of locating a target, comprising the steps of:
   transmitting a signal from a single transmitter to a target;
   receiving a return signal from the target using at least one receiver;
   calculating the round trip delay (RTD) from the transmitter to the target to said at least one receiver;
   receiving a signal from the target using at least three receivers;
   determining the Time of Arrival (TOA) of the signals at each receiver;
   calculating a measured Time Differential of Arrival (TDOA) using the TOA from each receiver; and
   using the measured TDOA and the RTD data to calculate at least a position estimate of the target.

2. A method of locating a target, according to claim 1, wherein the step of calculating at least a position estimate of the target further includes the steps of:
   calculating an initial azimuth of the target using the measured TDOA data; and
   using the initial azimuth and the RTD data to calculate at least an approximate plane position of the target.

3. The method of claim 2, wherein height is calculated from altitude data provided in the return signal from the target, such that the initial azimuth and RTD data combined with the height are used to calculate the approximate three-dimensional position of the target.

4. The method of claim 2, wherein transmission and reception of the signal is performed through the same antenna, such that the RTD data indicates the range of the target from the transmitter.

5. The method of claim 4, wherein said at least one receiver also functions as one of said at least three receivers.

6. The method of claim 1, wherein said signal received by said at least three receivers is said return signal.

7. The method of claim 2, wherein said signal received by said at least three receivers is said return signal.

8. The method of claim 4, further comprising the steps of:
   using the initial azimuth and RTD data to define an arc on which the target is located;
   selecting a predetermined number of points along said arc;
   calculating the expected TDOA for each point;
   comparing the expected TDOA for each point to said measured TDOA to determine a minimum error between the expected TDOA of each point and said measured TDOA; and
   selecting the azimuth associated with the expected TDOA having the minimum error as a more precise azimuth of the target; and
   using the more precise azimuth and the RTD data to calculate a more precise plane position of the target.

9. The method of claim 8, wherein each point arranged along said arc has the same RTD.

10. The method of claim 8, wherein said transmitter and said receivers are arranged in an array having an array baseline, and the length of said arc is approximately twice the length of said array baseline.

11. The method of claim 8, further comprising the steps of:
    using said more precise azimuth and RTD data to define a segment of said arc;
    selecting a second set of a predetermined number of points along said segment of said arc;
    calculating the expected TDOA for each point within said second set;
    comparing the expected TDOA for each point within said second set to said measured TDOA to determine a minimum error between the expected TDOA of each point in said second set and said measured TDOA; and
    selecting the azimuth associated with the expected TDOA having the minimum error as an even a more precise azimuth of the target; and
    using the even more precise azimuth and the RTD data to calculate an even more precise plane position of the target.

12. The method of claim 1, wherein said at least one receiver also functions as one of said at least three receivers.

13. The method of claim 1, wherein transmission and reception of the signal is performed through the same antenna, such that the RTD data indicates the range of the target from the transmitter.

14. The method of claim 1, wherein the position estimate, coordinates of said receivers, the TOAs and the RTD data are used to calculate a more precise position of the target.

15. The method of claim 14, wherein the more precise position is calculated by the steps of:
    a) estimating a new target position;
    b) calculating TOAs that correspond to the new target position;
    c) measuring the error between the calculated TOAs and the measured TOAs; and
    d) selecting the position estimate associated with the expected TOAs having the minimum error as the new position estimate of the target.

16. The method of claim 15, wherein steps a–d are repeated until the difference between the calculated TOAs and the measured TOAs is at least one of less than and equal to a predetermined value.

17. The method of claim 15, wherein the more precise position is calculated using a maximum likelihood algorithm.

18. The method of claim 17, wherein the maximum likelihood algorithm is the Newton-Raphson method.

19. The method of claim 17, wherein the maximum likelihood algorithm is the Simplex Downhill method.

20. The method of claim 1, wherein the height of the target is known and combined with the TDOA and the RTD data to calculate a position estimate of the target.

21. The method of claim 20, wherein the height is calculated from altitude data included in the reply signal from the target.

22. The method of claim 20, wherein the height is known from the determination that the target is on the ground.

23. The method of claim 20, wherein the position estimate, coordinates of the receivers, the TOAs, the height of the target and the RTD data are used to calculate a more precise position of the target.

24. The method of claim 23, wherein the more precise position is calculated by the steps of:
   a) estimating a new target position;
   b) calculating TOAs that correspond to the new target position;
   c) measuring the error between the calculated TOAs and the measured TOAs; and
   d) selecting the position estimate associated with the expected TOA having the minimum error as the new position estimate of the target.

25. The method of claim 24, wherein steps a–d are repeated until the difference between the calculated TOAs and the measured TOAs is at least one of less than and equal to a predetermined value.

26. The method of claim 24, wherein the more precise position is calculated using a maximum likelihood algorithm.

27. The method of claim 26, wherein the maximum likelihood algorithm is the Newton-Raphson method.

28. The method of claim 26, wherein the maximum likelihood algorithm is the Simplex Downhill method.

29. A system for locating a target, comprising:
   at least one transmitter for transmitting a signal to a target;
   at least one receiver for receiving a return signal from the target;
   a mechanism for calculating the round trip delay (RTD) from said transmitter to the target to said at least one receiver;
   at least three receivers for receiving a signal from the target;
   a mechanism for determining the Time of Arrival (TOA) of the signals at each receiver;
   a mechanism for calculating a measured Time Differential of Arrival (TDOA) using the TOA from each receiver;
   a mechanism for calculating an initial azimuth of the target using the measured TDOA data; and
   a mechanism for calculating at least an approximate plane position of the target using the initial azimuth and the RTD data.

30. The system of claim 29, wherein height is calculated from altitude data provided in the return signal from the target, such that the initial azimuth and RTD data combined with the height are used to calculate the approximate three-dimensional position of the target.

31. The system of claim 29, wherein transmission and reception of the signal is performed through the same antenna, such that the RTD data indicates the range of the target from the transmitter.

32. The system of claim 31, wherein said at least one receiver also functions as one of said at least three receivers.

33. The system of claim 31, further comprising:
   a mechanism for defining an arc on which the target is located using the initial azimuth and RTD data;
   a mechanism for selecting a predetermined number of points along said arc;
   a mechanism for calculating the expected TDOA for each point;
   a mechanism for comparing the expected TDOA for each point to said measured TDOA to determine a minimum error between the expected TDOA of each point and said measured TDOA; and
   a mechanism for selecting the azimuth associated with the expected TDOA having the minimum error as a more precise azimuth of the target; and
   a mechanism for calculating a more precise plane position of the target using the more precise azimuth and the RTD data.

34. The system of claim 33, wherein said points selected along said arc have the same RTD.

35. The system of claim 33, wherein said transmitter and said receivers are arranged in an array having an array baseline, and the length of said arc is defined to be approximately twice the length of said array baseline.

36. The system of claim 33, further comprising:
   a mechanism for defining a segment of said arc using said more precise azimuth and RTD data;
   a mechanism for selecting a second set of a predetermined number of points along said segment of said arc;
   a mechanism for calculating the expected TDOA for each point within said second set;
   a mechanism for comparing the expected TDOA for each point within said second set to said measured TDOA to determine a minimum error between the expected TDOA of each point in said second set and said measured TDOA; and
   a mechanism for selecting the azimuth associated with the expected TDOA having the minimum error as even a more precise azimuth of the target; and
   a mechanism for calculating an even more precise plane position of the target using the even more precise azimuth and the RTD data.

37. A system for locating a target, comprising:
   a single transmitter for transmitting a signal to a target;
   at least one receiver for receiving a return signal from the target;
   a mechanism for calculating the round trip delay (RTD) from said transmitter to the target to said at least one receiver;
   at least three receivers for receiving a signal from the target;
   a mechanism for determining the Time of Arrival (TOA) of the signals at each receiver;
   a mechanism for calculating a measured Differential Time of Arrival (TDOA) using the TOA from each receiver; and
   a mechanism for using the measured TDOA and the RTD data to calculate at least a position estimate of the target.

38. The system of claim 37, wherein said at least one receiver also functions as one of said at least three receivers.

39. The system of claim 37, wherein transmission and reception of the signal is performed through the same antenna, such that the RTD data indicates the range of the target from the transmitter.

40. The system of claim 37, further comprising a mechanism for calculating a more precise position of the target using the position estimate, coordinates of said receivers, the TOAs and the RTD data.

41. The system 40, further comprising a mechanism for:
 a) estimating a new target position;
 b) calculating TOAs that correspond to the new target position;
 c) measuring the error between the calculated TOAs and the measured TOAs; and
 d) selecting the position estimate associated with the expected TOA having the minimum error as the new position estimate of the target.

42. The system of claim 41, further comprising a mechanism for repeating steps a–d until the difference between the calculated TOAs and the measured TOAs is at least one of less than and equal to a predetermined value.

43. The system of claim 37, further comprising a mechanism for determining the height of the target.

44. The system of claim 43, wherein the height is calculated from altitude data included in the reply signal from the target.

45. The system of claim 43, further comprising a mechanism for determining that the target is on the ground.

46. The system of claim 43, further comprising a mechanism for calculating a position estimate of the target using the TDOA, the height of the target and the RTD data.

47. The system of claim 46, further comprising a mechanism for calculating a more precise position of the target using the position estimate, coordinates of the receivers, the TOAs, the height of the target and the RTD data.

48. The system 47, further comprising a mechanism for:
 a) estimating a new target position;
 b) calculating TOAs that correspond to the new target position;
 c) measuring the error between the calculated TOAs to the measured TOAs; and
 d) selecting the position estimate associated with the expected TOA having the minimum error as the new position estimate of the target.

49. The system of claim 48, further comprising a mechanism for repeating steps a–d until the difference between the calculated TOAs and the measured TOAs is at least one of less than and equal to a predetermined value.

* * * * *